US007679865B2

(12) United States Patent
Shoji

(10) Patent No.: US 7,679,865 B2
(45) Date of Patent: Mar. 16, 2010

(54) SPRING MEMBER FOR ACCELERATION SENSOR, ACCELERATION SENSOR AND MAGNETIC DISK DRIVE APPARATUS

(75) Inventor: Shigeru Shoji, Chuo-ku (JP)

(73) Assignee: TDK Corporation, Tokyo (JP)

( * ) Notice: Subject to any disclaimer, the term of this patent is extended or adjusted under 35 U.S.C. 154(b) by 918 days.

(21) Appl. No.: 11/482,796

(22) Filed: Jul. 10, 2006

(65) Prior Publication Data
US 2007/0030600 A1 Feb. 8, 2007

(30) Foreign Application Priority Data
Jul. 22, 2005 (JP) ............... 2005-212395

(51) Int. Cl.
*G11B 5/58* (2006.01)
*G01P 15/11* (2006.01)
(52) U.S. Cl. .................. 360/274; 73/515.31
(58) Field of Classification Search .......... 360/97.02, 360/274; 73/514.16, 514.31, 515.16, 515.31, 73/515.36
See application file for complete search history.

(56) References Cited
U.S. PATENT DOCUMENTS

| 4,849,655 | A | * | 7/1989 | Bennett | 73/514.31 |
| 5,027,657 | A | * | 7/1991 | Juckenack et al. | 73/514.13 |
| 6,131,457 | A | * | 10/2000 | Sato | 73/514.31 |
| 6,507,187 | B1 | * | 1/2003 | Olivas et al. | 324/207.21 |
| 7,219,549 | B2 | * | 5/2007 | Honkura et al. | 73/514.31 |
| 7,222,535 | B2 | * | 5/2007 | Shoji | 73/514.31 |
| 7,392,704 | B2 | * | 7/2008 | Shoji | 73/514.31 |
| 7,403,352 | B2 | * | 7/2008 | Shoji | 360/75 |
| 7,503,231 | B2 | * | 3/2009 | Shoji | 73/866.5 |
| 7,543,498 | B2 | * | 6/2009 | Shoji | 73/514.31 |
| 2006/0101911 | A1 | | 5/2006 | Shoji | |
| 2007/0022813 | A1 | * | 2/2007 | Kasajima | 73/514.31 |

FOREIGN PATENT DOCUMENTS

| JP | 02-238367 | 9/1990 |
| JP | 04-279867 | 10/1992 |
| JP | 6-201723 | 7/1994 |
| JP | 11-352143 | 12/1999 |

OTHER PUBLICATIONS

U.S. Appl. No. 11/549,820, filed Oct. 16, 2006.
U.S. Appl. No. 11/549,768, filed Oct. 16, 2006.
U.S. Appl. No. 11/414,301, filed May 1, 2006.
U.S. Appl. No. 11/453,090, filed Jun. 15, 2006.
U.S. Appl. No. 11/483,099, filed Jul. 10, 2006.
Japanese Office Action dated Nov. 11, 2008.

* cited by examiner

*Primary Examiner*—Angel A. Castro
(74) *Attorney, Agent, or Firm*—Frommer Lawrence & Haug LLP

(57) ABSTRACT

A spring member for an acceleration sensor for detecting acceleration in a direction of a Z-axis that is perpendicular to an X-Y plane includes a movable section having a plane plate shape, for fixing a magnetic field generation member with weight of the acceleration sensor, and a single support arm section having a strip shape parallel to a plane of the movable section when no acceleration is applied. One end of the single support arm section is integrally connected to one end of the movable section and the other end of the single support arm section is fixed. Only the single support arm section in a cantilever configuration supports the movable section.

14 Claims, 11 Drawing Sheets

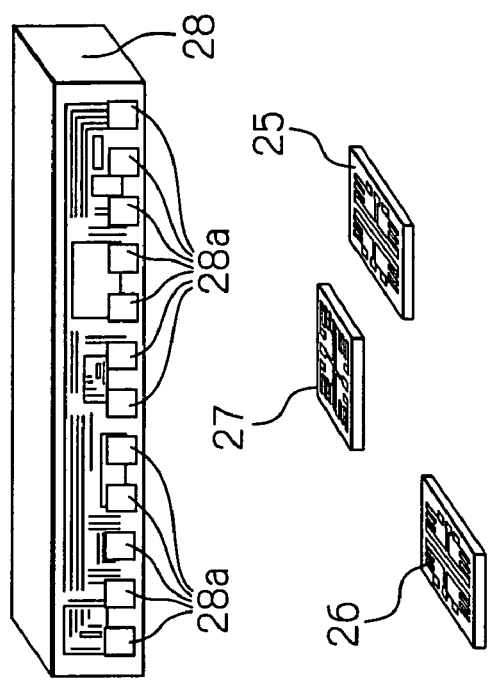
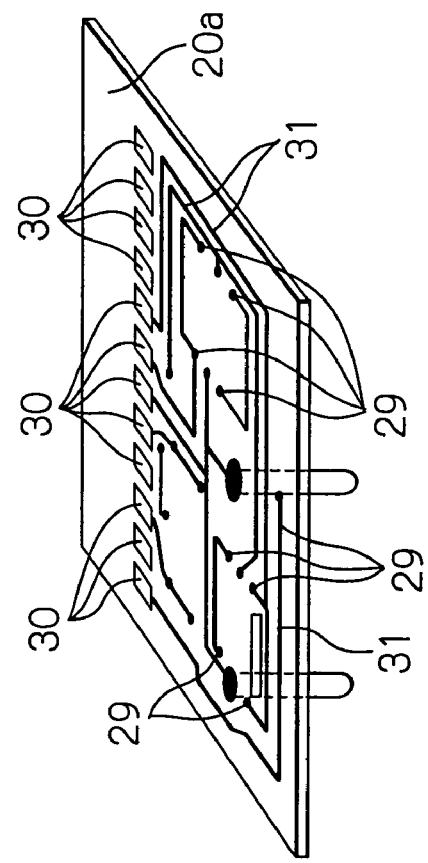
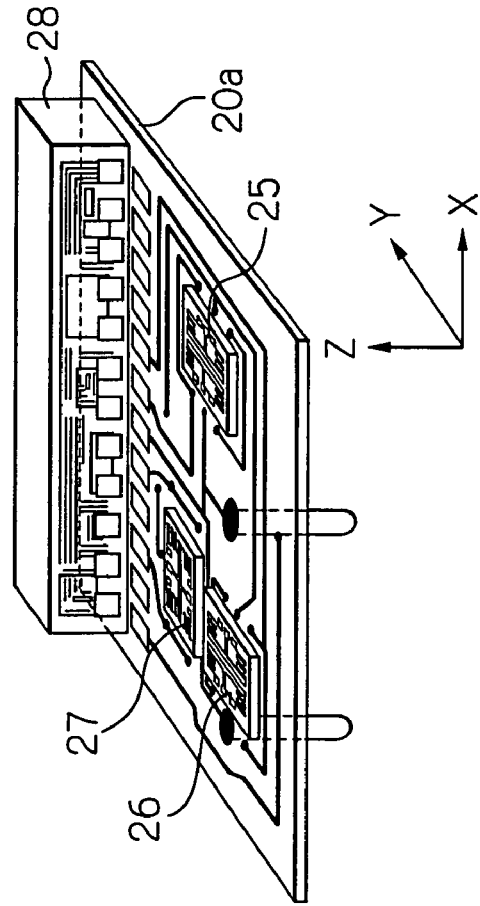
Fig. 7a
Fig. 7b

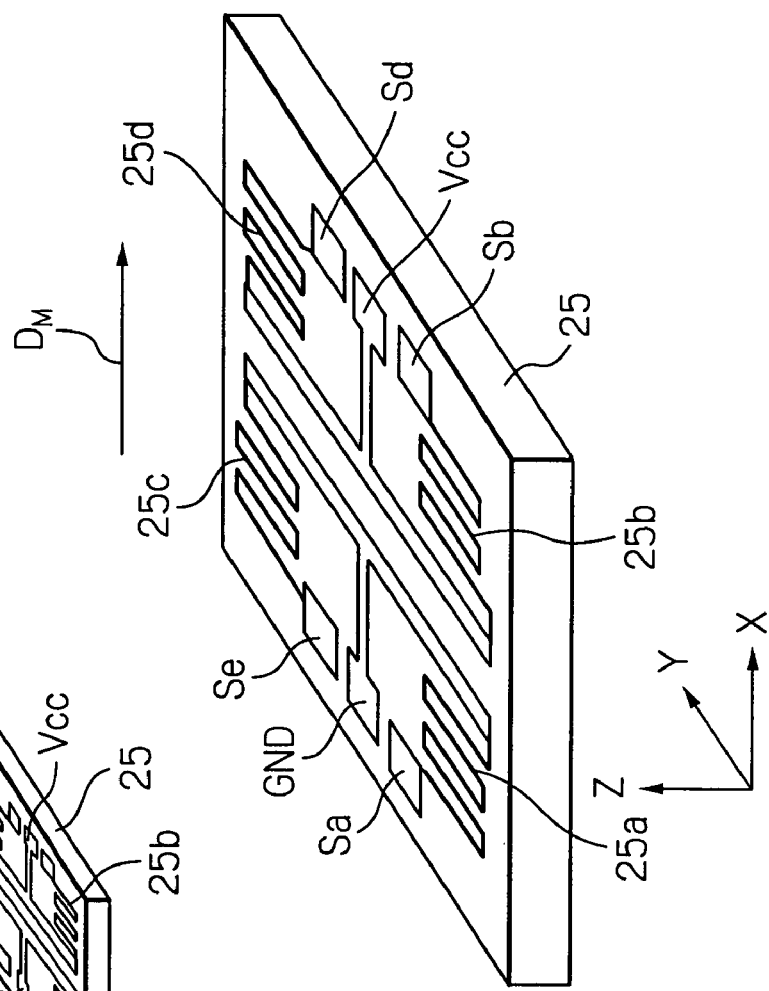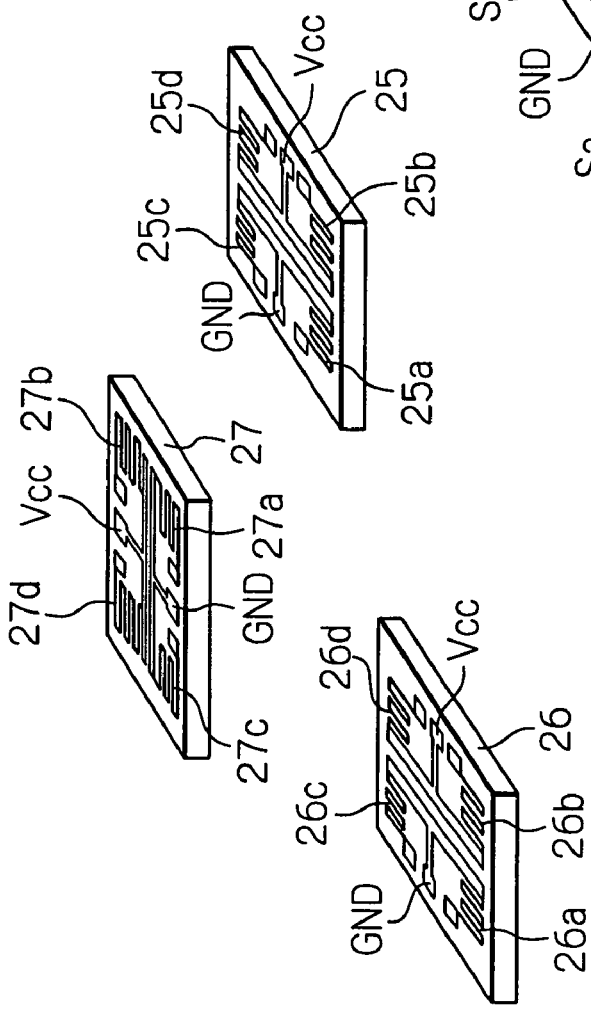

Fig. 10
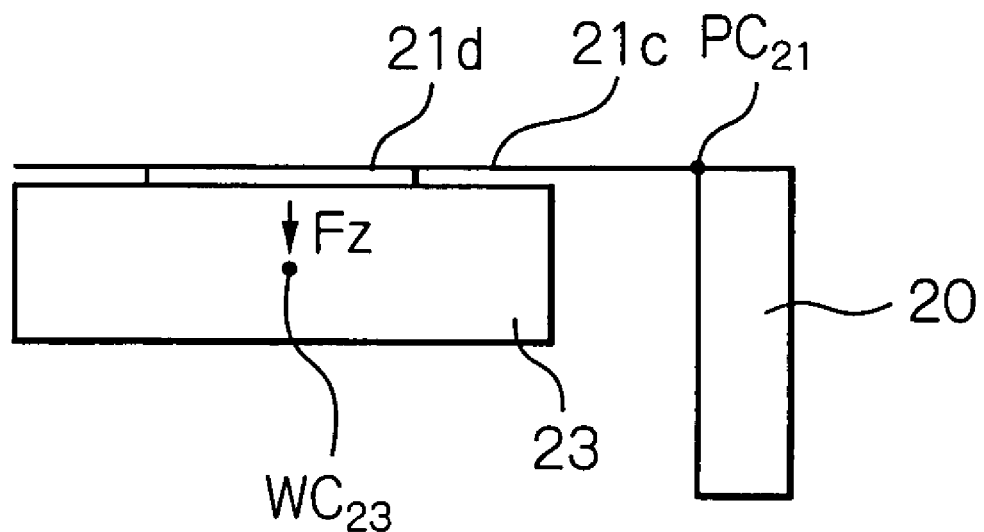
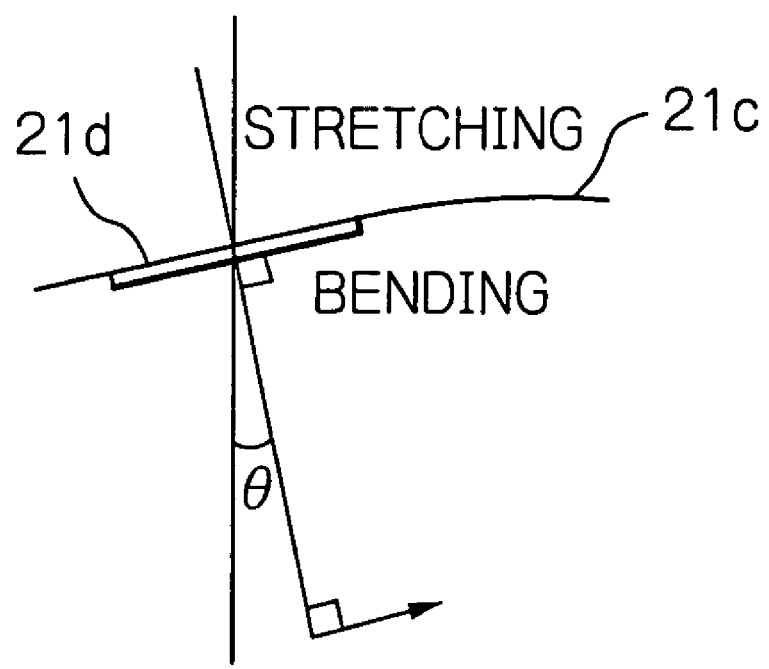

SPRING MEMBER FOR ACCELERATION SENSOR, ACCELERATION SENSOR AND MAGNETIC DISK DRIVE APPARATUS

PRIORITY CLAIM

This application claims priority from Japanese patent application No. 2005-212395, filed on Jul. 22, 2005, which is incorporated herein by reference.

BACKGROUND OF THE INVENTION

1. Field of the Invention

The present invention relates to a spring member for an acceleration sensor, to the acceleration sensor using the spring member, and to a magnetic disk drive apparatus with the acceleration sensor.

2. Description of the Related Art

In a magnetic disk drive apparatus or a hard disk drive (HDD) apparatus assembled in a mobile equipment such as for example a walkabout personal computer, a mobile phone, a digital audio player and other mobile gear, an HDD apparatus used as a mobile storage itself or a removable HDD apparatus, in order to prevent a collision of a magnetic head with a hard disk surface due to drop impact, it is necessary to detect the instant at which the HDD apparatus falls before occurrence of the drop impact and to retract the magnetic head from the hard disk surface. Such instant of the falling can be detected from a slight change in the acceleration of gravity.

U.S. Pat. No. 6,131,457 (Japanese patent publication No. 11-352134A) discloses an acceleration sensor for detecting a small change in the acceleration of gravity. This acceleration sensor has a magnetic body including a mass point on an axis along a Z-axis, mounted to a vibrator having three-dimensional freedom, and four or more magnetoresistive effect (MR) detector elements positioned on an X-axis and a Y-axis with their centers located along a perimeter of a concentric circle around the origin point of the orthogonal coordinate axes. The sensor is thus capable of detecting each of acceleration in the direction of X-axis through a relative difference in output voltage between the two detector elements on the X-axis due to a vibration of the magnetic field, acceleration in the direction of Y-axis through a relative difference in output voltage between the two detector elements on the Y-axis due to a vibration of the magnetic field, and acceleration in the direction of the Z-axis through a sum total of the output voltages of all the detector elements.

However, because this known acceleration sensor disclosed in U.S. Pat. No. 6,131,457 is configured to detect the Z-axis acceleration by summing the output voltages of the detector elements for the X-axis acceleration and the Y-axis acceleration, it is quite difficult to increase detection sensitivity in the Z-axis acceleration. Thus, in order to detect the Z-axis acceleration with high sensitivity, it is necessary to add an acceleration-detection mechanism specifically designed for detecting the Z-axis direction acceleration.

As for the acceleration-detection mechanism specifically designed for detecting the Z-axis direction acceleration, Japanese patent publication No. 06-201723A discloses an acceleration sensor with an elastic magnetic metal body attached to a housing in a cantilever manner so that this magnetic metal body and the housing are capable of relatively moving, and a strain resistance element mounted on the magnetic metal body. However, because the acceleration sensor described in Japanese patent publication No. 06-201723A is configured to detect the strain of the magnetic metal body and to utilize the strain resistance effect of the strain resistance element, it is difficult to expect a high sensitive detection of the Z-axis acceleration. Also, because it is necessary to have electrodes for extracting detection signals on the magnetic metal body itself, the structure of the sensor becomes complicated due to the lead lines connected to the electrodes. Furthermore, when the magnetic metal body is miniaturized, wiring process of such lead lines becomes extremely difficult. Also, the lead lines formed on the miniaturized magnetic metal body may induce breakage of the lead lines when an excessive value of impact is applied, and prevent distortion of the magnetic metal body to interface with the improvement in sensitivity of the sensor. This tendency becomes more pronounced as the acceleration sensor becomes smaller.

In addition, combination of such acceleration sensor specifically designed for detecting the Z-axis direction acceleration with the acceleration sensor for detecting the X-axis acceleration and the Y-axis acceleration makes miniaturization of the acceleration sensor more difficult.

SUMMARY OF THE INVENTION

It is therefore an object of the present invention to provide a spring member for an acceleration sensor, the acceleration sensor, and a magnetic disk drive apparatus with the acceleration sensor, whereby stable and highly sensitive detection of acceleration in a Z-axis direction can be expected even though having an extremely miniaturized structure.

According to the present invention, a spring member for an acceleration sensor for detecting acceleration in a direction of a Z-axis that is perpendicular to an X-Y plane includes a movable section having a plane plate shape, for fixing a magnetic field generation member with weight of the acceleration sensor, and a single support arm section having a strip shape parallel to a plane of the movable section when no acceleration is applied. One end of the single support arm section is integrally connected to one end of the movable section and the other end of the single support arm section is fixed. Only the single support arm section in a cantilever configuration supports the movable section.

The spring member used in the acceleration sensor for detecting acceleration in a direction of the Z-axis has a movable section formed in a plane plate shape and a single support arm section formed in a plane strip shape. The movable section is used to attach a magnetic field generation member with weight. The support arm section becomes in parallel with the movable section when no acceleration is applied. The support arm section in a cantilever configuration supports the movable section. Therefore, when acceleration in the Z-axis direction is applied thereto under the conditions where the magnetic field generation member with weight is mounted on the movable section, produced is a rotation moment turning about the base of the support arm section that constitutes a cantilevered spring. This rotation moment and repulsion due to bending and stretching of the support arm section are brought into balance. Thus, the magnetic field generation member with weight is inclined a small angle corresponding to the applied acceleration with respect to the Z-axis. As a result, the direction of the bias magnetic field from the magnetic field generation member with weight changes by this small angle. Particularly, according to the present invention, because the support arm section has the strip shape that is parallel to the plane of the movable section, the support arm section sensitively responds to specifically the Z-axis acceleration and thus bends and stretches into the Z-axis direction. Therefore, it is possible to detect the Z-axis acceleration with high sensitivity. Also, because this spring member for detecting specifically the Z-axis acceleration has the plane plate shape, it is easy to integrate in a plane shape with the spring member for detecting other two axes accelerations, that is X-axis and Y-axis accelerations. As a result, it is possible to easily and more downsize the acceleration sensor.

According to the present invention, also, a spring member includes a first movable section having a plane plate shape, for fixing a first magnetic field generation member with weight used for detecting acceleration in a direction of Z-axis that is perpendicular to an X-Y plane, a single first support arm section having a strip shape parallel to a plane of the first movable section when no acceleration is applied, at least two second support arm sections each having a strip shape parallel to the X-Y plane when no acceleration is applied, the at least two second support arm sections freely moving in a X-axis direction and a Y-axis direction and capable of twisting, and a second movable section having a plane plate shape parallel to the at least two second support arm sections when no acceleration is applied, for fixing a second magnetic field generation member with weight used for detecting accelerations in directions of X-axis and Y-axis. One end of the single first support arm section is integrally connected to one end of the first movable section and the other end of the single first support arm section is fixed. The second movable section is supported by the at least two second support arm sections. Only the single first support arm section in a cantilever configuration supports the first movable section. The first movable section, the first support arm section, the second movable section and the at least two second support arm sections are integrally formed.

It is preferred that the at least two second support arm sections include four support arms running along the X-axis direction and the Y-axis direction perpendicular to each other, and that one ends of the four support arms are connected to an outer frame section fixed to a housing member and the other ends of the four support arms are connected to the second movable section.

According to the present invention, further, an acceleration sensor includes a first spring member for detecting acceleration in a direction of a Z-axis that is perpendicular to an X-Y plane, a housing member, a first magnetic field generation member with weight, and a first magnetic field detection sensor attached to the housing member to face the first magnetic field generation member with weight. The first spring member includes a first movable section having a plane plate shape, fixed to the first magnetic field generation member with weight, and a single first support arm section having a strip shape parallel to a plane of the first movable section when no acceleration is applied. One end of the single first support arm section is integrally connected to one end of the first movable section and the other end of the single first support arm section is connected to an outer frame section fixed to the housing member. Only the single first support arm section in a cantilever configuration supports the first movable section. The first magnetic field detection sensor has at least one multi-layered magnetoresistive effect (MR) element having a lamination plane parallel to the X-Y plane and including a magnetization fixed layer and a magnetization free layer. The at least one multi-layered MR element is arranged to receive from the first magnetic field generation member with weight magnetic field substantially perpendicular to the lamination plane of the at least one multi-layered MR element when no acceleration is applied.

A bias magnetic field is applied to the multi-layered MR element in a direction perpendicular to the lamination plane of the multi-layered MR element from the first magnetic field generation member with weight that is fixed to the movable section of the first spring member. Then, inclination of the first magnetic field generation member with weight produced by a balance between a rotation moment due to the applied acceleration and a repulsion of the first spring member is detected as magnetization vector strength in the direction of the magnetization free layer. Because the magnetization vector is detected by the magnetic field detection sensor provided with at least one multi-layered MR element including a magnetization fixed layer and a magnetization free layer, such as for example a giant magnetoresistive effect (GMR) element or a tunnel magnetoresistive effect (TMR) element, highly sensitive acceleration detection in the Z-axis direction can be expected.

Furthermore, because it is not necessary to form electrodes on the first spring member and the first magnetic field generation member with weight, the wiring structure can be simplified. Also, since the bias magnetic field is applied to the magnetic field detection sensor from the first magnetic field generation member with weight, this acceleration sensor is insensitive to possible external electrical field and magnetic field applied thereto. In addition, because of a low impedance, the acceleration sensor according to the present invention is relatively unaffected by external disturbance when compared with the piezo-electric type acceleration sensor and the electrostatic capacitance type acceleration sensor.

It is preferred that the acceleration sensor further includes a second spring member for detecting accelerations in directions of an X-axis and a Y-axis, having a plane plate shape parallel to the X-Y plane when no acceleration is applied, the second spring member freely moving in a X-axis direction and a Y-axis direction, a second magnetic field generation member with weight fixed to the second spring member, and second and third magnetic field detection sensors attached to the housing member to face the second magnetic field generation member with weight, that each of the second and third magnetic field detection sensors has at least one multi-layered magnetoresistive effect element having a lamination plane parallel to the X-axis direction and the Y-axis direction respectively, and includes a magnetization fixed layer and a magnetization free layer, and that the at least one multi-layered magnetoresistive effect element is arranged to receive from the second magnetic field generation member with weight magnetic field substantially perpendicular to the lamination plane of the at least one multi-layered magnetoresistive effect element when no acceleration is applied.

It is also preferred that the second spring member has at least two second support arm sections capable of twisting, and a second movable section fixed to the second magnetic field generation member with weight and supported by the at least two second support arm sections. In this case, preferably, the at least two second support arm sections of the second spring member include four support arms running along the X-axis direction and the Y-axis direction perpendicular to each other, and one ends of the four support arms are connected to an outer frame section fixed to the housing member and the other ends of the four support arms are connected to the second movable section.

It is also preferred that the first spring member and the second spring member are integrally formed to have a single plane plate shape. Since the spring members for an acceleration sensor that detects accelerations in the three axes of X-axis, Y-axis and Z-axis are integrated in the same plane, the acceleration sensor itself can be extremely miniaturized.

It is further preferred that the first magnetic field generation member with weight is fixed to one surface of the first spring member so as to convert acceleration applied thereto into a rotation moment.

It is also preferred that the second magnetic field generation member with weight is fixed to one surface of the second spring member so as to convert acceleration applied thereto into a rotation moment.

It is preferred that the at least one multi-layered magnetoresistive effect element of the first magnetic field detection sensor, the second magnetic field detection sensor, or the third magnetic field detection sensor includes at least one linear section running along a direction perpendicular to a magnetization direction of the magnetization fixed layer in the lamination plane.

It is also preferred that the at least one multi-layered magnetoresistive effect element of the second magnetic field detection sensor includes at least one linear section running along a direction perpendicular to a magnetization direction of the magnetization fixed layer in the lamination plane.

It is also preferred that each multi-layered MR element of the first magnetic field detection sensor, the second magnetic field detection sensor, or the third magnetic field detection sensor is a GMR element or a TMR element.

According to the present invention, furthermore, a magnetic disk drive apparatus is provided with the aforementioned acceleration sensor.

Further objects and advantages of the present invention will be apparent from the following description of the preferred embodiments of the invention as illustrated in the accompanying drawings.

BRIEF DESCRIPTION OF THE DRAWINGS

FIGS. 7a and 7b are an oblique view and an exploded oblique view schematically illustrating structures of a wiring board, magnetic filed detection sensors and an IC chip of the acceleration sensor shown in FIG. 2;

FIGS. 8a and 8b are an oblique view schematically illustrating structures of the magnetic filed detection sensors of the acceleration sensor shown in FIG. 2 and an enlarged oblique view illustrating one of the sensor chips;

FIG. 10 is a view illustrating operation of the acceleration sensor shown in FIG. 2;

DESCRIPTION OF THE PREFERRED EMBODIMENTS

Figure 1:
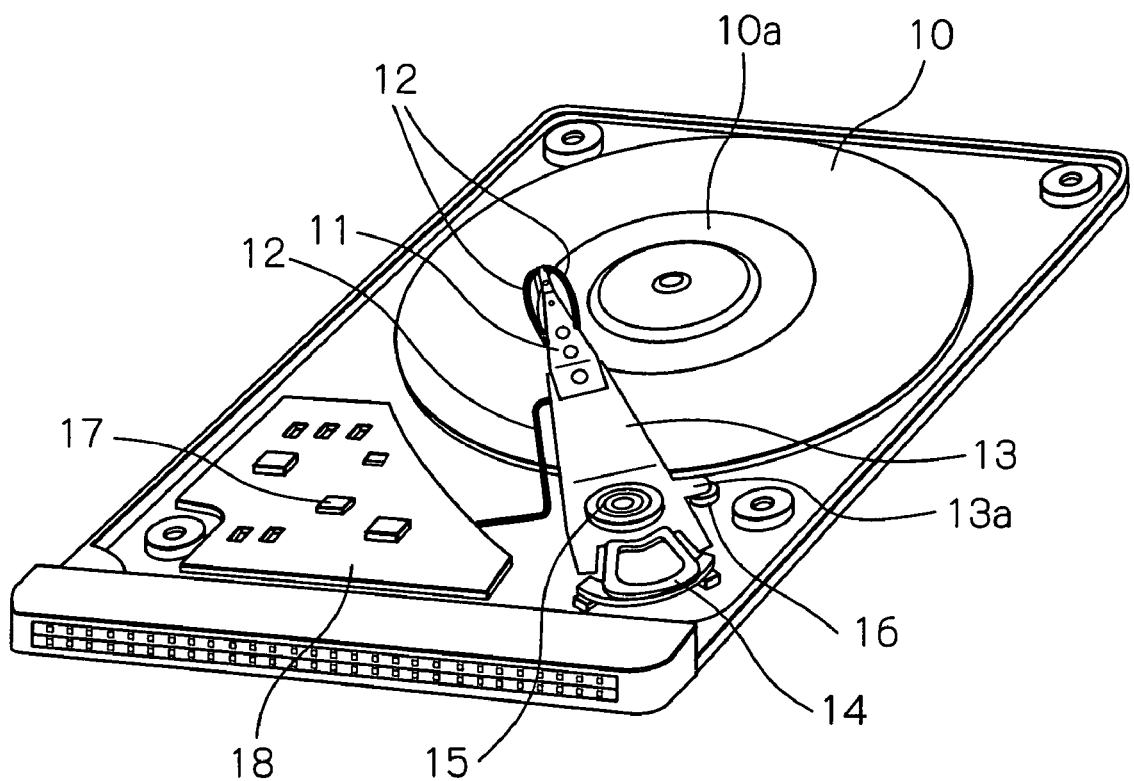
FIG. 1 is an oblique view schematically illustrating a whole structure of an example of a magnetic disk drive apparatus with an acceleration sensor assembled therein.

FIG. 1 schematically illustrates a whole structure of an example of a magnetic disk drive apparatus with an acceleration sensor assembled therein. This magnetic disk drive apparatus is a micro HDD apparatus using at least one magnetic disk of for example 2.5 inches, 1.8 inches, 1.3 inches, or 1.0 or less inches. Such micro HDD apparatus may be an HDD apparatus assembled in mobile equipment such as for example a walkabout personal computer, a mobile phone, a digital audio player or other mobile gear, or an HDD apparatus used itself as a mobile storage or a removable HDD.

In the figure indicating uncovered state of the magnetic disk drive apparatus, reference numeral 10 denotes a magnetic disk rotated by a spindle motor in operation, and 10a denotes a retracted zone of the magnetic disk, with no written data. A magnetic head moves into the retracted zone upon detection of drop of the magnetic disk drive apparatus. In the figure, also, reference numeral 11 denotes a head gimbal assembly (HGA). The magnetic head facing to the magnetic disk 10 in operation is attached at the top end section of this HGA 11. Reference numeral 12 denotes a flexible printed circuit (FPC) that is a lead conductor member electrically connected to the magnetic head, 13 denotes a support arm for supporting the HGA 11, 14 denotes a voice coil motor (VCM) that is an actuator for positioning the magnetic head by pivoting the support arm 13 about an axis 15, 16 denotes a ramp on which a tub 13a of the support arm 13 is climbed to lift the magnetic disk away from the magnetic disk surface upon detection of drop, and 17 denotes an acceleration sensor mounted on a circuit board 18, respectively.

Figure 2:
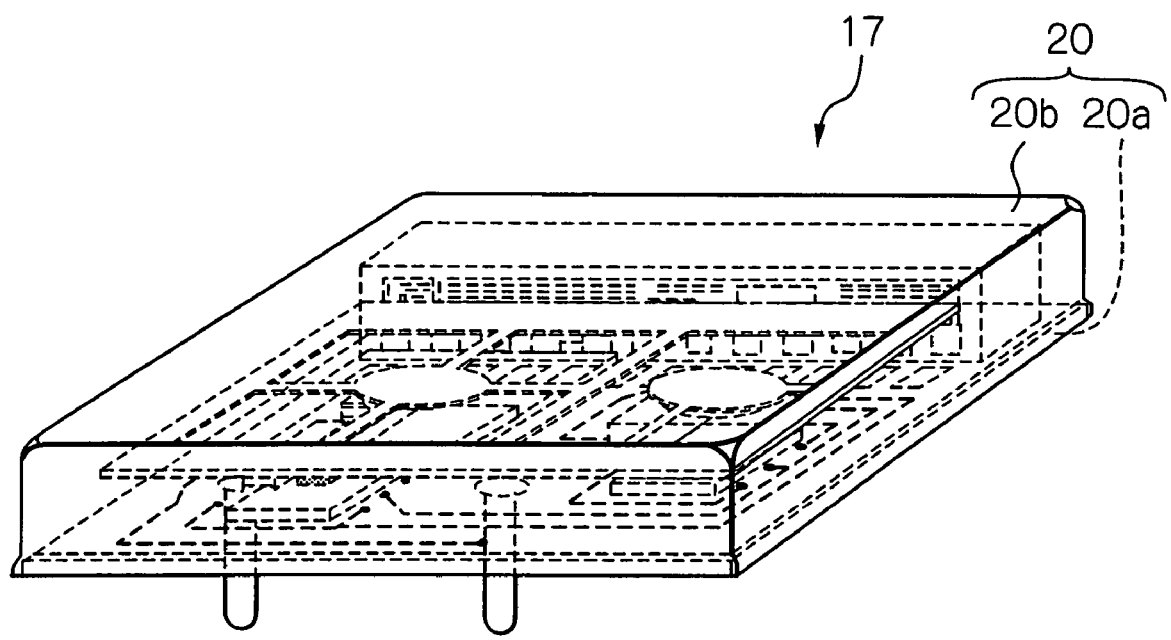
FIG. 2 is an oblique view schematically illustrating an appearance of an acceleration sensor as a preferred embodiment according to the present invention.
Figure 3:
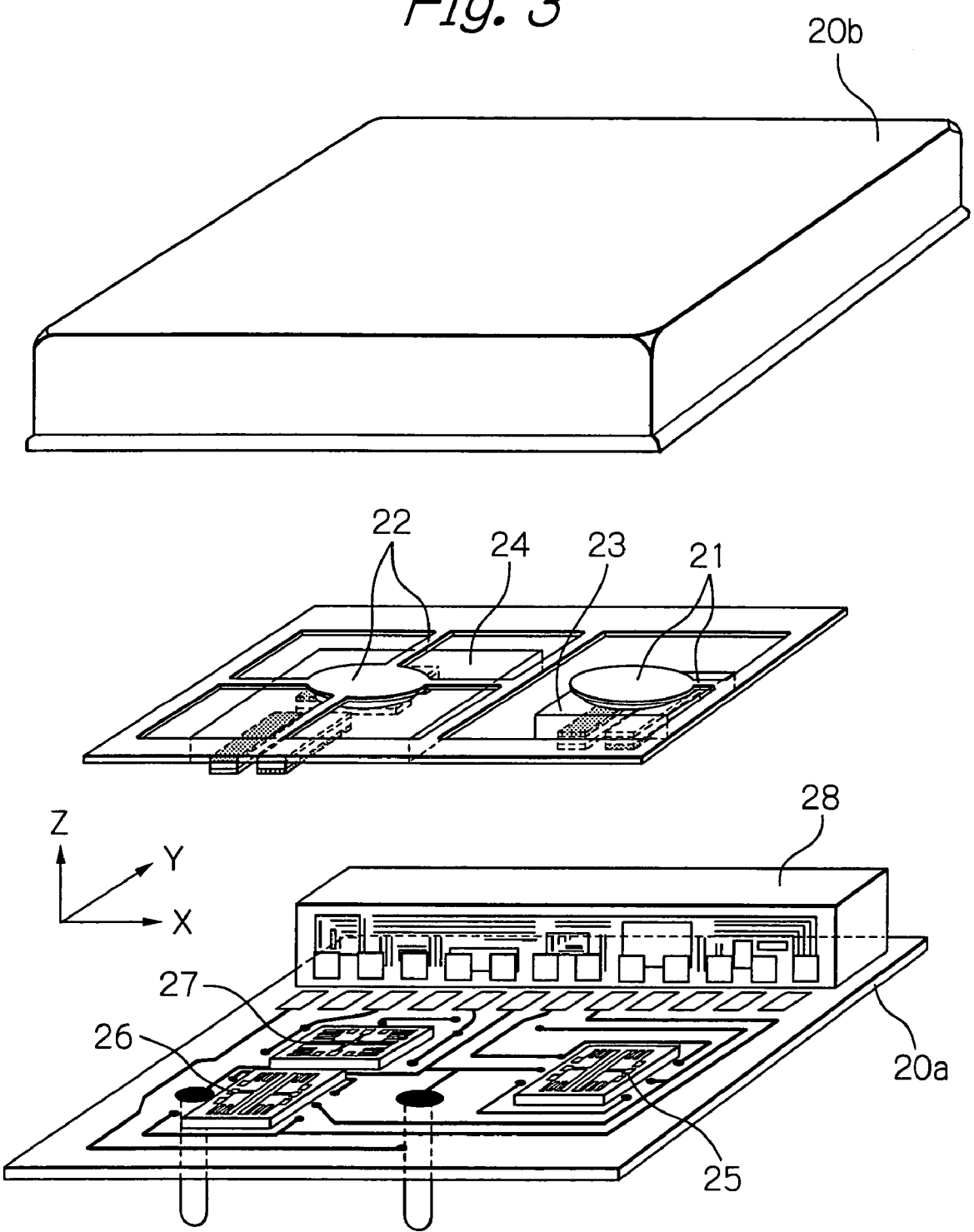
FIG. 3 is an exploded oblique view schematically illustrating a whole structure of the acceleration sensor shown in FIG. 2.
Figure 4:
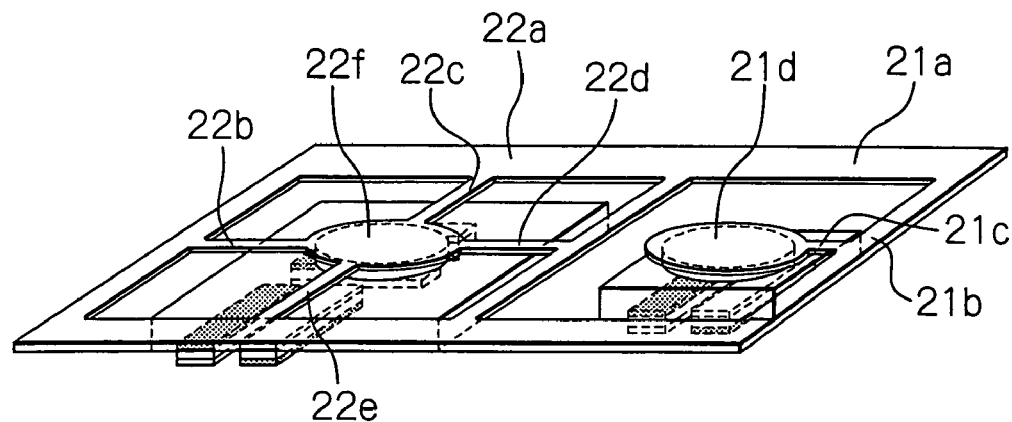
FIG. 4 is an oblique view schematically illustrating structures of spring members and magnetic field generation members with weight of the acceleration sensor shown in FIG. 2.
Figure 5:
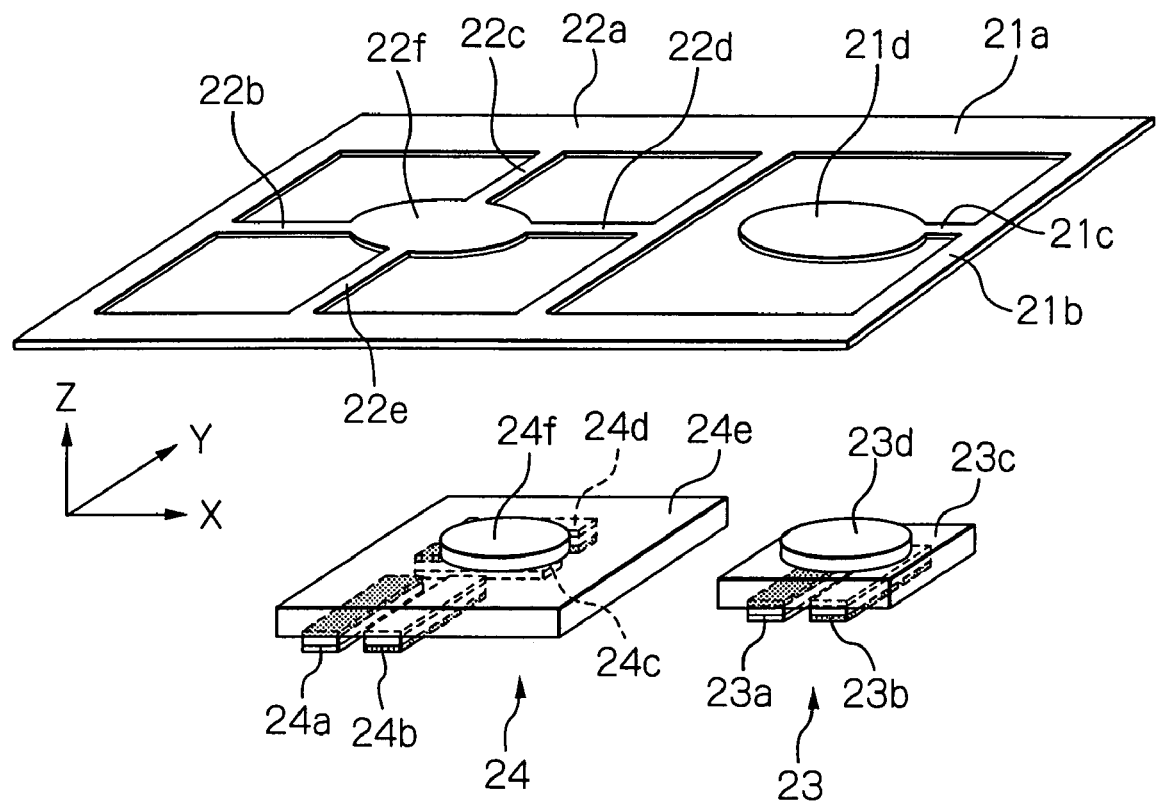
FIG. 5 is an exploded oblique view schematically illustrating structures of the spring members and the magnetic field generation members with weight of the acceleration sensor shown in FIG. 2.
Figure 6B:
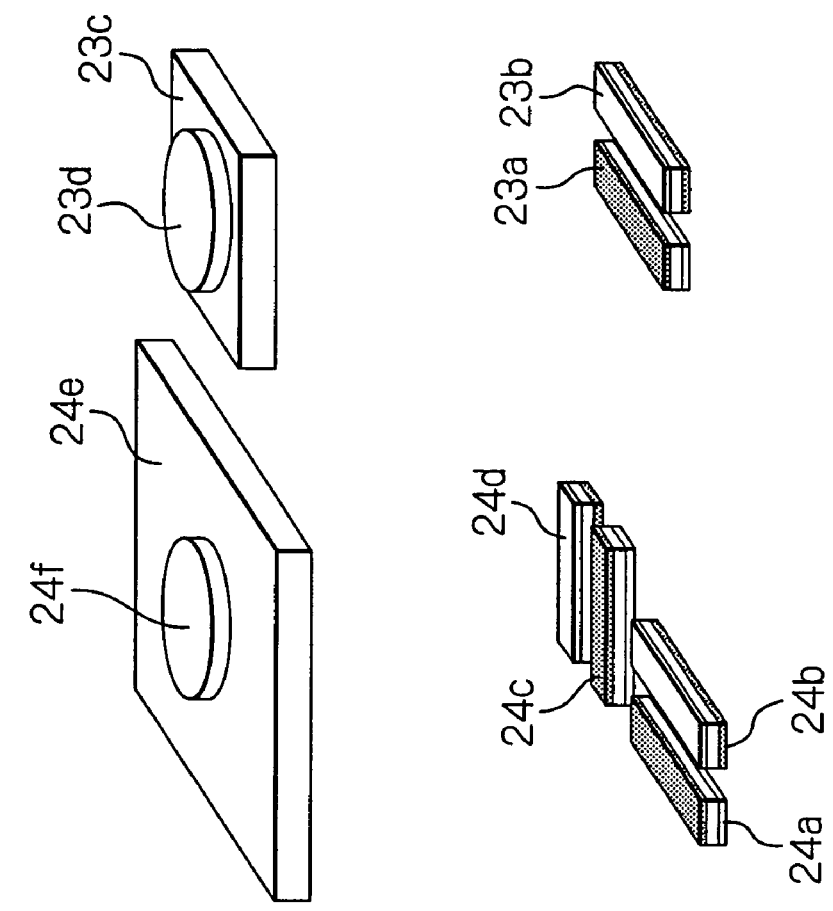
FIGS. 6a and 6b are an oblique view and an exploded oblique view schematically illustrating structures of the magnetic field generation members with weight of the acceleration sensor shown in FIG. 2.
Figure 6A:
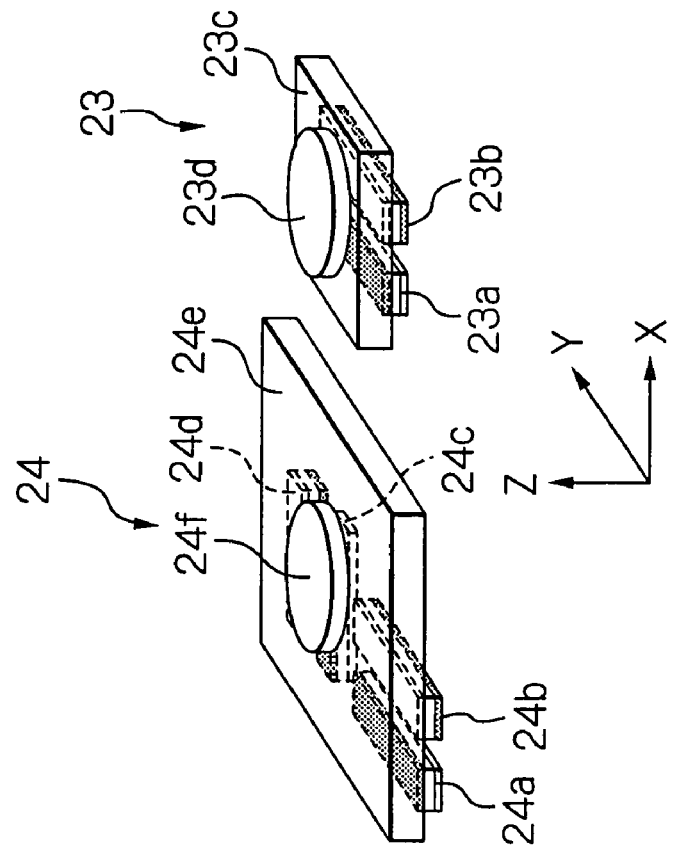

FIG. 2 schematically illustrates an appearance of the acceleration sensor 17 as a preferred embodiment according to the present invention, FIG. 3 schematically illustrating a whole structure of the acceleration sensor, FIG. 4 schematically illustrates structures of spring members and magnetic field generation members with weight of the acceleration sensor, FIG. 5 schematically illustrates structures of the spring members and the magnetic field generation members with weight of the acceleration sensor, and FIGS. 6a and 6b schematically illustrate structures of the magnetic field generation members with weight of the acceleration sensor.

As shown in FIG. 3 in detail, the acceleration sensor in this embodiment is used for detecting accelerations in three axes of X-axis direction, Y-axis direction and Z-axis direction. The acceleration sensor has first and second spring members 21 and 22 integrally formed with each other, first and second magnetic field generation members with weight 23 and 24, a first magnetic field detection sensor 25 for the Z-axis direction acceleration, a second magnetic field detection sensor 26 for the X-axis direction acceleration, a third magnetic field detection sensor 27 for the Y-axis direction acceleration, and an IC chip 28, accommodated in a housing member 20.

The housing member 20 consists of a flat-shaped wiring board 20a made of a resin material such as for example polyimide or BT resin, and a cover member 20b made of a magnetic metal material for covering and for sealing the wiring board 20a. In this embodiment, accelerations along three axes that are in X-axis direction, Y-axis direction and Z-axis direction can be detected by the magnetic field detection sensors mounted on a single plane of the wiring board 20a.

The first and second spring members 21 and 22 are integrally formed from a thin-film metal plate made of for example NiFe, Ni or else, from a thin plate made of for example stainless steel, or from a thin resin plate made of for example polyimide, to have a shape shown in FIG. 5.

More concretely, the first spring member 21 is formed in a shape with a rectangular first outer frame section 21a fixed to the wiring board 20a via a seat or spacer (not shown) or to the cover member 20b and sandwiched between the wiring board 20a and the cover member 20b of the housing member 20, a single strip-shaped support arm section 21c that has one end integrally connected with a center of a fixing frame edge 21b of the first outer frame section 21a and is capable of bending and stretching, and a movable section 21d located in a center of the first outer frame section 21a and integrally connected with the other ends of the support arm section 21c. Thus, the first spring member 21 constitutes a cantilever spring in which the movable section 21d is supported at a single point. Although the support arm section 21c is running along the X-axis in this embodiment, it may be running along the Y-axis in modifications. In this embodiment, the movable section 21d is shaped in a circle. However, in modifications, the movable section 21d may be formed in a rectangular shape or other shape.

The second spring member 22 is formed in a shape with a rectangular second outer frame section 22a integrally formed with the first outer frame section 21a, four strip-shaped support arm sections 22b, 22c, 22d and 22e that have one ends integrally connected with centers of the respective frame edges of the second outer frame section 22a and are capable of twisting, and a movable section 22f located in a center of the second outer frame section 22a and integrally connected with the other ends of the support arm sections 22b, 22c, 22d and 22e. Thus, the second spring member 22 constitutes a four-direction stretching spring in which the movable section 22f is stretched in four directions. The support arm sections 22b and 22d and the support arm sections 22c and 22e are running along the X-axis and the Y-axis perpendicular to each other, respectively. In this embodiment, the movable section 21f is shaped in a circle. However, in modifications, the movable section 22f may be formed in a rectangular shape or other shape.

As shown in FIGS. 6a and 6b in detail, the first and second magnetic field generation members with weight 23 and 24 for providing magnetic fields with directions that change in response to the accelerations to the first to third magnetic field detection sensors 25 to 27 are fixed by adhesive to the centers of one surfaces of the movable sections 21d and 22f of the first and second spring members 21 and 22, respectively.

The first magnetic field generation member with weight 23 has a pair of permanent magnets 23a and 23b for generating magnetic field applied to the first magnetic field detection sensor 25 for the Z-axis direction acceleration, a base member 23c, doubling as a weight, to which the permanent magnets 23a and 23b are fixed by adhesive, and a spacer member 23d fixed by adhesive to the base member 23c and used to provide a space between this base member 23c and the support arms of the first spring member 21 so as to prevent interference between them and also to prevent bonding of them by the adhesive.

The base member 23c is made of a magnetic metal material such as Al—TiC ($Al_2O_3$—TiC) in this embodiment, and the spacer member 23d is made of a stainless steel in this embodiment. The base member 23c and the spacer member 23d may be made of another material and/or may be integrally formed.

Each of the pair of permanent magnets 23a and 23b is made of a ferrite material and shaped in a rectangular parallelepiped shape running in parallel with the Y-axis direction. These permanent magnets 23a and 23b are fixed to the base member 23c so as to face the first magnetic field detection sensor 25 for the Z-axis direction acceleration. The pair of permanent magnets 23a and 23b are arranged so that their surfaces facing the first magnetic field detection sensor 25 have different magnetic polarities with each other. A closed magnetic loop is formed by these permanent magnets 23a and 23b and the base member 23c. As will be mentioned later, spin valve GMR elements in the first magnetic field detection sensor 25 are arranged within this closed magnetic loop so that a magnetic field or bias field is applied in a direction substantially perpendicular to the lamination plan of these spin valve GMR elements.

The second magnetic field generation member with weight 24 has a pair of permanent magnets 24a and 24b for generating magnetic field applied to the second magnetic field detection sensor 26 for the X-axis direction acceleration, a pair of permanent magnets 24c and 24d for generating magnetic field applied to the third magnetic field detection sensor 27 for the Y-axis direction acceleration, a base member 24e, doubling as a weight, to which the permanent magnets 24a to 24d are fixed by adhesive, and a spacer member 24f fixed by adhesive to the base member 24e and used to provide a space between this base member 24e and the support arms of the second spring member 22 so as to prevent interference between them and also to prevent bonding of them by the adhesive.

The base member 24e is made of a magnetic metal material such as Al—TiC ($Al_2O_3$—TiC) in this embodiment, and the spacer member 24f is made of a stainless steel in this embodiment. The base member 24e and the spacer member 24f may be made of another material and/or may be integrally formed.

Each of the pair of permanent magnets 24a and 24b is made of a ferrite material and shaped in a rectangular parallelepiped shape running in parallel with the Y-axis direction. These permanent magnets 24a and 24b are fixed to the base member 24e so as to face the second magnetic field detection sensor 26 for the X-axis direction acceleration. The pair of permanent magnets 24a and 24b are arranged so that their surfaces facing the second magnetic field detection sensor 26 have different magnetic polarities with each other. A closed magnetic loop is formed by these permanent magnets 24a and 24b and the base member 24e. As will be mentioned later, spin valve GMR elements in the second magnetic field detection sensor 26 are arranged within this closed magnetic loop so that a magnetic field or bias field is applied in a direction substantially perpendicular to the lamination plan of these spin valve GMR elements.

Each of the pair of permanent magnets 24c and 24d is made of a ferrite material and shaped in a rectangular parallelepiped shape running in parallel with the X-axis direction. These permanent magnets 24c and 24d are fixed to the base member 24e so as to face the third magnetic field detection sensor 27 for the Y-axis direction acceleration. The pair of permanent magnets 24c and 24d are arranged so that their surfaces facing the third magnetic field detection sensor 27 have different magnetic polarities with each other. A closed magnetic loop is formed by these permanent magnets 24c and 24d and the base member 24e. As will be mentioned later, spin valve GMR elements in the third magnetic field detection sensor 27 are arranged within this closed magnetic loop so that a magnetic field or bias field is applied in a direction substantially perpendicular to the lamination plan of these spin valve GMR elements.

FIGS. 7a and 7b schematically illustrate structures of the wiring board, the magnetic filed detection sensors and the IC chip of the acceleration sensor shown in FIG. 2, and FIGS. 8a and 8b schematically illustrate structures of the magnetic filed detection sensors of the acceleration sensor shown in FIG. 2 and one of the sensors.

As shown in FIGS. 7a and 7b, the first magnetic field detection sensor 25 for detecting acceleration in the Z-axis direction, the second magnetic field detection sensor 26 for detecting acceleration in the X-axis direction, the third magnetic field detection sensor 27 for detecting acceleration in the Y-axis direction, and the IC chip 28 are mounted on the wiring board 20a. Connection pads 29 and 30 wire-bonded or gold-ball-bonded (GBB) to terminal electrodes of these magnetic field detection sensors 25 to 27 and to terminal electrodes 28a of the IC chip 28 respectively are formed on this wiring board 20a.

These connection pads 29 and 30 are electrically connected via lead conductor pattern 31 to a power supply terminal electrode, a ground terminal electrode and signal output terminal electrodes, which are not shown, formed on the wiring board 20a.

As illustrated in detail in FIG. 8b, in the first magnetic field detection sensor 25 for detecting acceleration in the Z-axis direction, two pairs of or four spin valve GMR elements 25a, 25b, 25c and 25d are formed in parallel with each other. Each of the spin valve GMR elements 25a to 25d has a linear section running along a direction (Y-axis direction) perpendicular to the X-axis. The spin valve GMR elements 25a and 25b constitute one pair and, in this embodiment, they are connected in series with each other via signal electrode terminals Sa and Sb at the outside of the first magnetic field detection sensor 25. Both ends of the serially connected elements 25a and 25b are electrically connected to the power supply terminal electrode Vcc and the ground terminal electrode GND, respectively.

The spin valve GMR elements 25c and 25d also constitute one pair and, in this embodiment, they are connected in series with each other via signal electrode terminals Sc and Sd at the outside of the first magnetic field detection sensor 25. Both ends of the serially connected elements 25c and 25d are electrically connected to the power supply terminal electrode Vcc and the ground terminal electrode GND, respectively. Therefore, these spin valve GMR elements 25a, 25b, 25c and 25d are connected in full-bridge configuration.

Each of the spin valve GMR elements 25a, 25b, 25c and 25d has a multi-layered structure mainly consisting of a magnetization fixed layer constituted by a pin layer of an antiferromagnetic material and a pinned layer of a ferromagnetic material, a nonmagnetic space layer, and a magnetization free layer (free layer) of a ferromagnetic material. The magnetization of the pinned layer is fixed in a direction perpendicular to a running direction of the free layer. Namely, in the magnetization of the first magnetic field detection sensor 25 for detecting acceleration in the Z-axis direction, all the pinned layers are fixed in the same direction $D_M$ that is the X-axis direction.

The bias magnetic fields respectively applied to the pair of spin valve GMR elements 25a and 25b connected in series with each other are in the directions opposite to each other. Thus, the magnetization directions of the respective pinned layers in these spin valve GMR elements 25a and 25b are fixed to the same direction $D_M$. The bias magnetic fields in the directions opposite to each other are obtained because a closed magnetic loop is formed by the pair of permanent magnets 23a and 23b and the pair of spin valve GMR elements 25a and 25b are arranged in the respective paths of the closed magnetic loop, through which magnetic fields flow in the directions opposite to each other. In this case, the center of the magnetic circuit that constitutes the closed magnetic loop is located on the centerline between the pair of spin valve GMR elements 25a and 25b.

To the pair of spin valve GMR elements 25c and 25d connected in series with each other, the same bias magnetic fields in the directions opposite to each other are applied and the magnetization directions of the respective pinned layers in these spin valve GMR elements 25c and 25d are fixed to the same direction. In this case, also, the center of the magnetic circuit that constitutes the closed magnetic loop is located on the centerline between the pair of spin valve GMR elements 25c and 25d.

Since the magnetization directions of the respective pinned layers in the pair of spin valve GMR elements 25a and 25b and the pair of spin valve GMR elements 25c and 25d are fixed to the same direction by applying the opposite direction bias magnetic fields thereto, these four spin valve GMR elements 25a, 25b, 25c and 25d can be formed in a single chip resulting the acceleration sensor to more downsize.

As illustrated in FIG. 8a, in the second magnetic field detection sensor 26 for detecting acceleration in the X-axis direction, two pairs of or four spin valve GMR elements 26a, 26b, 26c and 26d are formed in parallel with each other. Each of the spin valve GMR elements 26a to 26d has a linear section running along a direction (Y-axis direction) perpendicular to the X-axis. The spin valve GMR elements 26a and 26b constitute one pair and, in this embodiment, they are connected in series with each other via signal electrode terminals at the outside of the second magnetic field detection sensor 26. Both ends of the serially connected elements 26a and 26b are electrically connected to the power supply terminal electrode Vcc and the ground terminal electrode GND, respectively.

The spin valve GMR elements 26c and 26d also constitute one pair and, in this embodiment, they are connected in series with each other via signal electrode terminals at the outside of the second magnetic field detection sensor 26. Both ends of the serially connected elements 26c and 26d are electrically connected to the power supply terminal electrode Vcc and the ground terminal electrode GND, respectively. Therefore, these spin valve GMR elements 26a, 26b, 26c and 26d are connected in full-bridge configuration.

Each of the spin valve GMR elements 26a, 26b, 26c and 26d has a multi-layered structure mainly consisting of a magnetization fixed layer constituted by a pin layer of an antiferromagnetic material and a pinned layer of a ferromagnetic material, a nonmagnetic space layer, and a magnetization free layer (free layer) of a ferromagnetic material. The magnetization of the pinned layer is fixed in a direction perpendicular to a running direction of the free layer. Namely, in the magnetization of the second magnetic field detection sensor 26 for detecting acceleration in the X-axis direction, all the pinned layers are fixed in the same direction that is the X-axis direction.

The bias magnetic fields respectively applied to the pair of spin valve GMR elements 26a and 26b connected in series with each other are in the directions opposite to each other. Thus, the magnetization directions of the respective pinned layers in these spin valve GMR elements 26a and 26b are fixed to the same direction. The bias magnetic fields in the directions opposite to each other are obtained because a closed magnetic loop is formed by the pair of permanent magnets 24a and 24b and the pair of spin valve GMR elements 26a and 26b are arranged in the respective paths of the closed magnetic loop, through which magnetic fields flow in the directions opposite to each other. In this case, the center of the magnetic circuit that constitutes the closed magnetic loop is located on the centerline between the pair of spin valve GMR elements 26a and 26b.

To the pair of spin valve GMR elements 26c and 26d connected in series with each other, the same bias magnetic fields in the directions opposite to each other are applied and the magnetization directions of the respective pinned layers in these spin valve GMR elements 26c and 26d are fixed to the same direction. In this case, also, the center of the magnetic circuit that constitutes the closed magnetic loop is located on the centerline between the pair of spin valve GMR elements 26c and 26d.

Since the magnetization directions of the respective pinned layers in the pair of spin valve GMR elements 26a and 26b and the pair of spin valve GMR elements 26c and 26d are fixed to the same direction by applying the opposite direction bias magnetic fields thereto, these four spin valve GMR elements 26a, 26b, 26c and 26d can be formed in a single chip resulting the acceleration sensor to more downsize.

As illustrated in FIG. 8a, in the third magnetic field detection sensor 27 for detecting acceleration in the Y-axis direction, two pairs of or four spin valve GMR elements 27a, 27b, 27c and 27d are formed in parallel with each other. Each of the spin valve GMR elements 27a to 27d has a linear section running along a direction (X-axis direction) perpendicular to the Y-axis. The spin valve GMR elements 27a and 27b constitute one pair and, in this embodiment, they are connected in series with each other via signal electrode terminals at the outside of the third magnetic field detection sensor 27. Both ends of the serially connected elements 27a and 27b are electrically connected to the power supply terminal electrode Vcc and the ground terminal electrode GND, respectively.

The spin valve GMR elements 27c and 27d also constitute one pair and, in this embodiment, they are connected in series with each other via signal electrode terminals at the outside of the third magnetic field detection sensor 27. Both ends of the serially connected elements 27c and 27d are electrically connected to the power supply terminal electrode Vcc and the ground terminal electrode GND, respectively. Therefore, these spin valve GMR elements 27a, 27b, 27c and 27d are connected in full-bridge configuration.

Each of the spin valve GMR elements 27a, 27b, 27c and 27d has a multi-layered structure mainly consisting of a magnetization fixed layer constituted by a pin layer of an antiferromagnetic material and a pinned layer of a ferromagnetic material, a nonmagnetic space layer, and a magnetization free layer (free layer) of a ferromagnetic material. The magnetization of the pinned layer is fixed in a direction perpendicular to a running direction of the free layer. Namely, in the magnetization of the third magnetic field detection sensor 27 for detecting acceleration in the Y-axis direction, all the pinned layers are fixed in the same direction that is the Y-axis direction.

The bias magnetic fields respectively applied to the pair of spin valve GMR elements 27a and 27b connected in series with each other are in the directions opposite to each other. Thus, the magnetization directions of the respective pinned layers in these spin valve GMR elements 27a and 27b are fixed to the same direction. The bias magnetic fields in the directions opposite to each other are obtained because a closed magnetic loop is formed by the pair of permanent magnets 24c and 24d and the pair of spin valve GMR elements 27a and 27b are arranged in the respective paths of the closed magnetic loop, through which magnetic fields flow in the directions opposite to each other. In this case, the center of the magnetic circuit that constitutes the closed magnetic loop is located on the centerline between the pair of spin valve GMR elements 27a and 27b.

To the pair of spin valve GMR elements 27c and 27d connected in series with each other, the same bias magnetic fields in the directions opposite to each other are applied and the magnetization directions of the respective pinned layers in these spin valve GMR elements 27c and 27d are fixed to the same direction. In this case, also, the center of the magnetic circuit that constitutes the closed magnetic loop is located on the centerline between the pair of spin valve GMR elements 27c and 27d.

Since the magnetization directions of the respective pinned layers in the pair of spin valve GMR elements 27a and 27b and the pair of spin valve GMR elements 27c and 27d are fixed to the same direction by applying the opposite direction bias magnetic fields thereto, these four spin valve GMR elements 27a, 27b, 27c and 27d can be formed in a single chip resulting the acceleration sensor to more downsize.

In modifications, the first magnetic field detection sensor 25 for detecting acceleration in the Z-axis direction may have a configuration rotated together with the first spring member 21 and the first magnetic field generation member with weight 23 by 90 degrees in the X-Y plane.

The IC chip 28 is provided with an amplifier circuit for amplifying the differential output signal from the first to third magnetic field detection sensors 25 to 27, and also a multiplexing circuit for providing in time-divisional manner differential output signals corresponding respectively to the Z-axis acceleration, the X-axis acceleration and the Y-axis acceleration through a single signal output terminal.

Figure 9C:
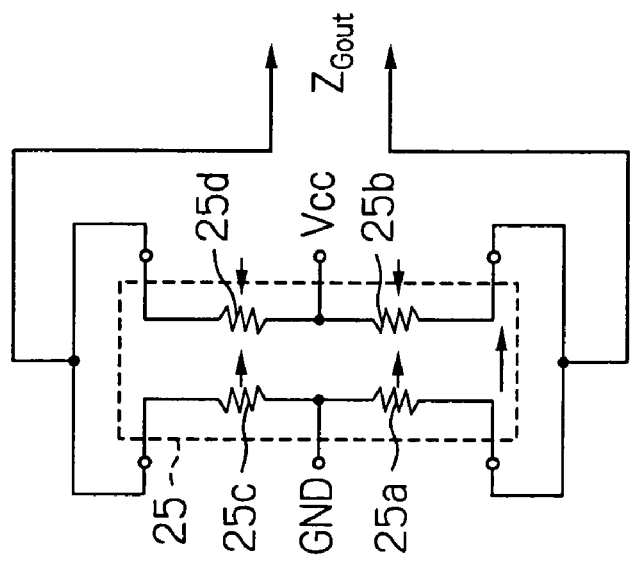
FIGS. 9a, 9b and 9c are circuit diagrams illustrating electrical connection structures of first to third magnetic filed detection sensors of the acceleration sensor shown in FIG. 2.
Figure 9B:
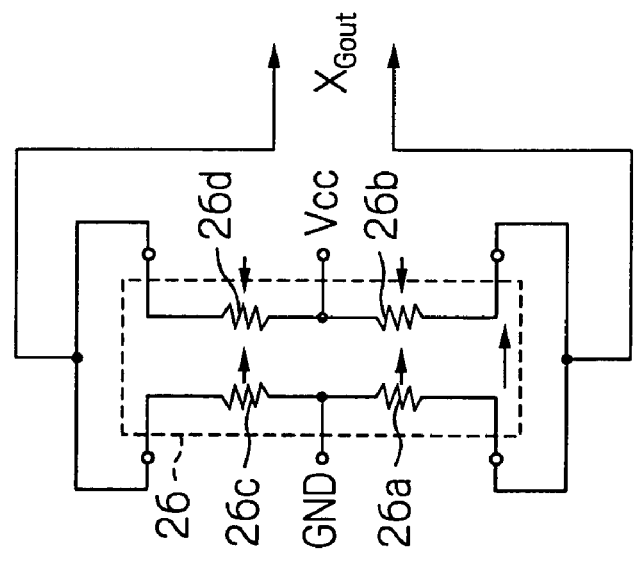
Figure 9A:
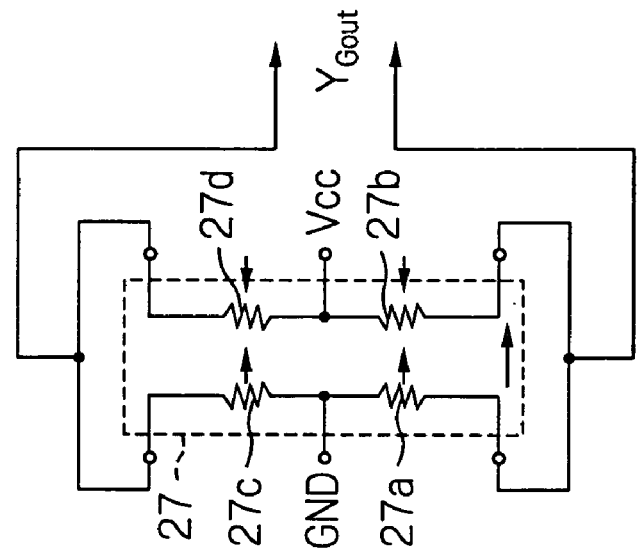

FIGS. 9a, 9b and 9c illustrate electrical connection structures of these first to third magnetic filed detection sensors 25 to 27.

In each magnetic field detection sensor, two pairs of spin valve GMR elements are formed. One ends of one pair of spin valve GMR elements are connected in series to each other at the outside the magnetic field detection sensor and its middle point is connected to the signal output terminal electrode. The other ends of this one pair of spin valve GMR elements are connected to the power supply terminal electrode Vcc and the ground terminal electrode GND, respectively. One ends of the other pair of spin valve GMR elements are connected in series to each other at the outside the magnetic field detection sensor and its middle point is connected to the signal output terminal electrode. The other ends of the other pair of spin valve GMR elements are connected to the power supply terminal electrode Vcc and the ground terminal electrode GND, respectively. Therefore, these four spin valve GMR elements in each magnetic field detection sensor are connected in full-bridge configuration and a differential output signal is derived from the signal output terminal electrodes. In modifications, the pair of the spin valve GMR elements may be connected in series to each other within each magnetic field detection sensor.

FIG. 10 illustrates operation of the acceleration sensor for detecting acceleration in the Z-axis direction, in this embodiment. Hereinafter, detection of acceleration in the Z-axis direction will be described with reference to this figure.

As shown in the figure, because the first magnetic field generation member with weight 23 is fixed to the movable section 21d of the first spring member 21 and this movable section 21d is supported by the support arm section 21c as a cantilevering manner, the center of gravity or weight center $WC_{23}$ of the first magnetic field generation member with weight 23 deviates from the pivot center $PC_{21}$ of the first spring member 21. Thus, when acceleration $F_Z$ in the Z-axis direction is applied, this acceleration $F_Z$ is converted to a moment turning about the base of the fixing frame edge 21b of the support arm section 21c that constitutes a cantilevered spring.

This rotation moment and repulsion due to bending and stretching of the support arm section 21c are brought into balance. As a result, the first magnetic field generation member with weight 23 is inclined a small angle θ with respect to the X-axis and therefore the direction of the bias magnetic field changes by the angle θ to the X-axis direction from the perpendicular direction to the lamination plane of the spin valve GMR element.

Because the spin valve GMR element in the first magnetic field detection sensor 25 for detecting acceleration in the Z-axis direction is magnetized in the X-axis direction, the GMR element extremely sensitively responds to this small change in angle θ and abruptly changes its MR resistance.

Figure 11:
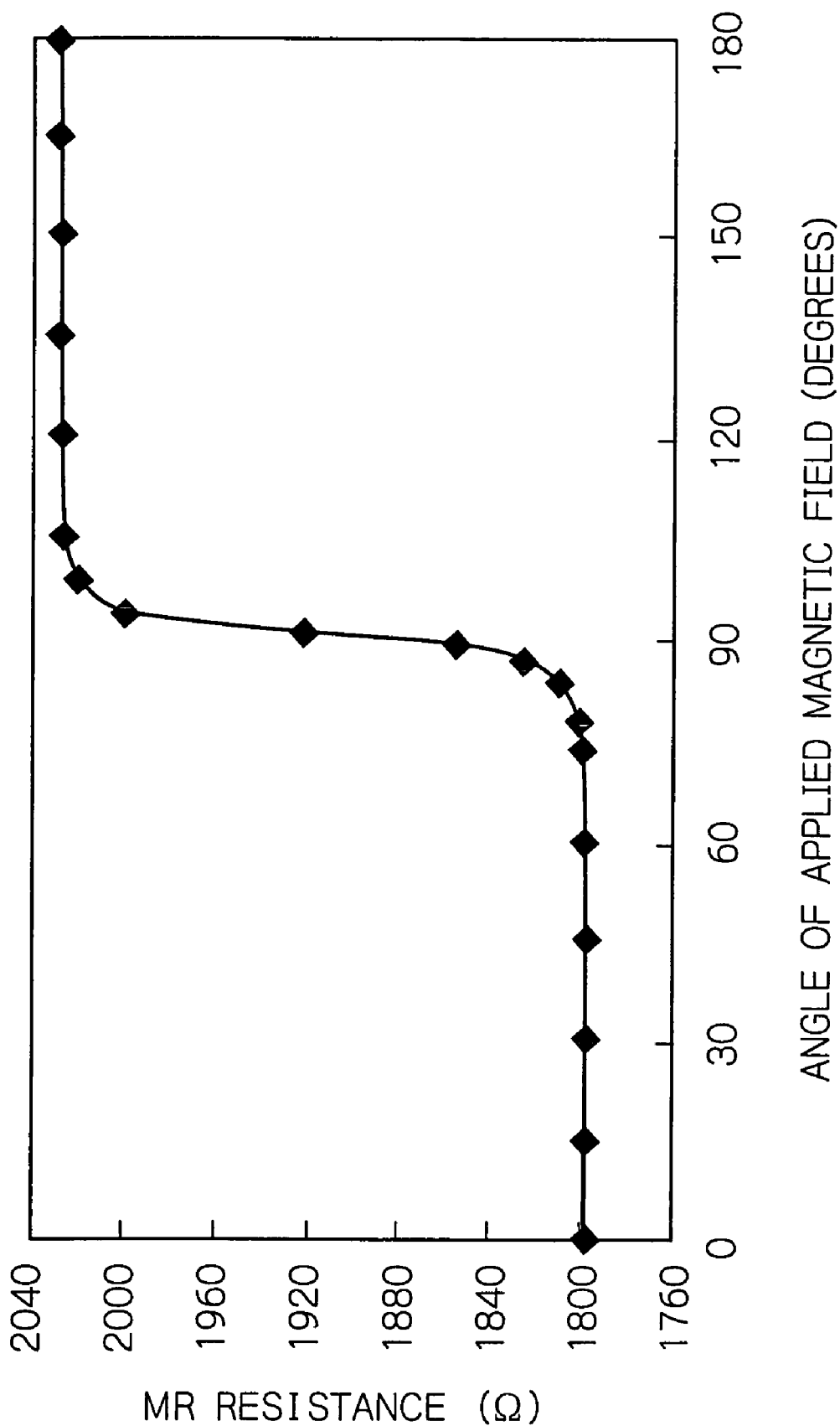
FIG. 11 is a view illustrating characteristics of an MR resistance variation versus an applied magnetic field angle with respect to a lamination plane of a spin valve GMR element.

FIG. 11 illustrates characteristics of the MR resistance variation versus the applied magnetic field angle with respect to the lamination plane of the spin valve GMR element. In the figure, the lateral axis represents an angle (degrees) between the applied magnetic field or the bias magnetic field and the direction along which the free layer runs, that is a direction perpendicular to the magnetization direction, and the longitudinal axis represents an MR resistance (Ω).

As will be noted from the figure, the MR resistance of the spin valve GMR element will greatly change depending upon a slight change near 90 degrees of angle in the bias magnetic field. Because the small angle change θ of the bias magnetic field to the X-axis corresponds to 90 degrees ±θ, the small inclination of the first magnetic field generation member with weight 23, that is, the permanent magnets 23a and 23b is extracted as a change in MR resistance. This change in MR resistance indicates not only the amount of angle change but also positive and negative directions of angle change.

According to this embodiment, particularly, since the support arm section 21c of the first spring member 21 supports the movable section 21d as a cantilevering manner and has a strip shape parallel to the plane of this movable section 21d, and also the first magnetic field generation member with weight 23 is fixed to this movable section 21d, it is possible to sensitively respond to the acceleration in Z-axis direction and thus highly sensitive detection in this direction can be expected.

Figure 12:
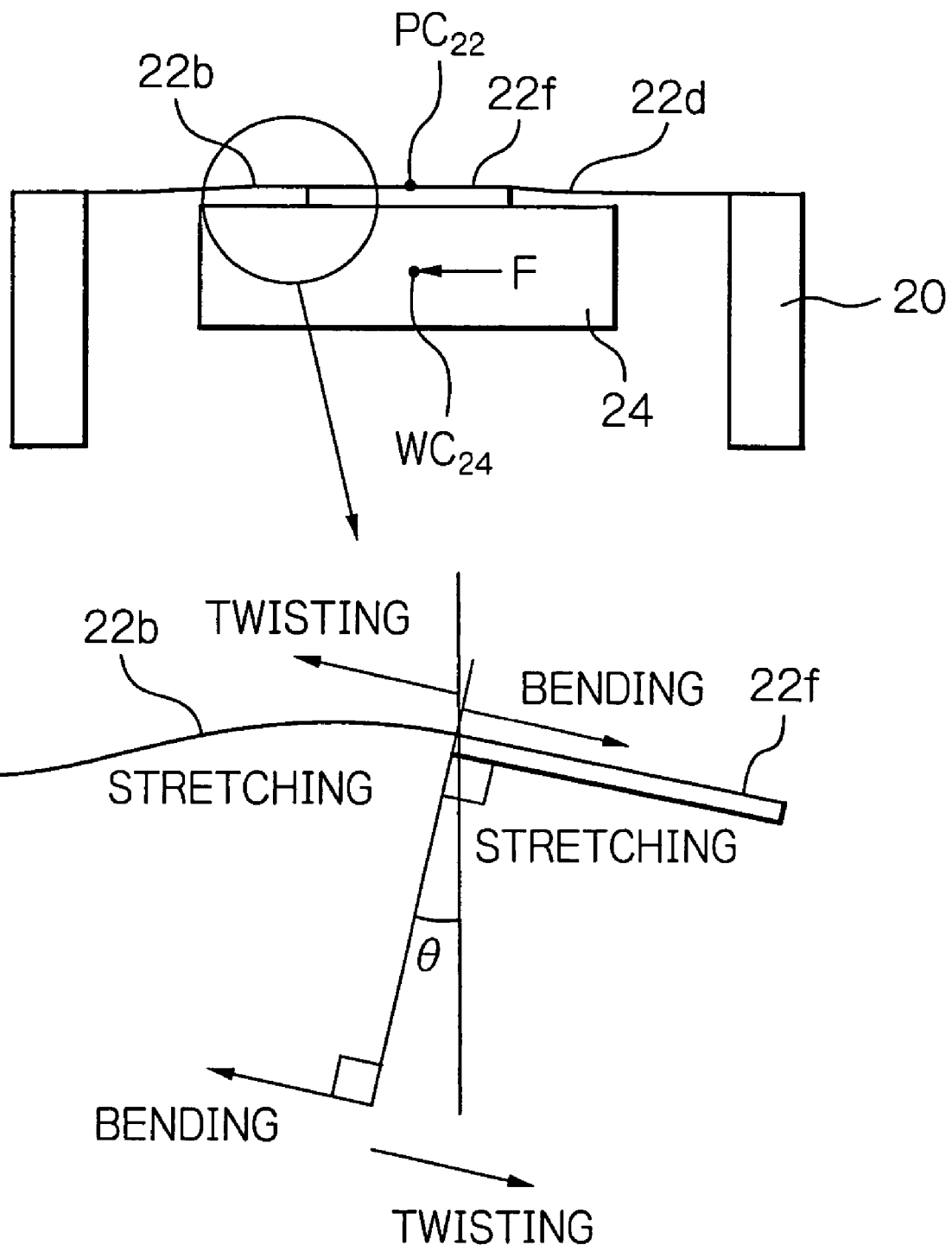
FIG. 12 is a view illustrating operation of the acceleration sensor shown in FIG. 2.

FIG. 12 illustrates operation of the acceleration sensor in this embodiment. Hereinafter, detection of acceleration in the X-axis direction will be described with reference to this figure.

As shown in the figure, because the second magnetic field generation member with weight 24 is fixed on one surface of the movable section 22f of the second spring member 22, the center of gravity or weight center $WC_{24}$ of the second magnetic field generation member with weight 24 deviates from the pivot center $PC_{22}$ of the second spring member 22. Thus, when acceleration $F_X$ in a lateral direction such as in the X-axis direction is applied, this acceleration $F_X$ is converted to a moment turning about the support arms 22c and 22e.

This rotation moment and repulsion due to twisting of the support arm sections 22c and 22e and repulsion due to bending and stretching of the support arm sections 22b and 22d are brought into balance. In this case, the repulsion due to twisting is predominant. As a result, the second magnetic field generation member with weight 24 is inclined a small angle θ with respect to the X-axis and therefore the direction of the bias magnetic field changes by the angle θ to the X-axis direction from the perpendicular direction to the lamination plane of the spin valve GMR element.

Because the spin valve GMR element in the second magnetic field detection sensor 26 for detecting acceleration in the X-axis direction is magnetized in the X-axis direction, the GMR element extremely sensitively responds to this small change in angle θ and abruptly changes its MR resistance.

Similar to this, detection of acceleration in the Y-axis direction is performed by the permanent magnets 24c and 24d of the second magnetic field generation member with weight 24 and by the third magnetic field sensor chip 27.

As a result, the amount of and the positive and negative of acceleration in each direction to be detected, that is in each of the Z-axis, X-axis and Y-axis directions, can be sensed by each of the magnetic field detection sensors 25 to 27. Therefore, the number of the magnetic field detection sensors can be decreased and also the structure of each sensor can be extremely simplified resulting the total size of the acceleration sensor to extremely miniaturize. Particularly, because the first spring member 21 and the second spring member 22 used for detecting accelerations in three axes directions, that is the Z-axis, X-axis and Y-axis directions are united to have a single flat plate shape, it is possible to more miniaturize the acceleration sensor. Furthermore, because the spin valve GMR element is quite sensitive in magnetic field change, highly sensitive acceleration detection can be expected.

According to this embodiment, the first magnetic field generation member with weight 23 has one pair of the permanent magnets 23a and 23b with opposite magnetic polarities to each other on its surface that faces the first magnetic filed detection sensor 25, so as to provide a closed magnetic loop. The pair of spin valve GMR elements 25a and 25b of the first magnetic field detection sensor 25 are arranged just under these permanent magnets 23a and 23b to face them. Therefore, the pair of spin valve GMR elements 25a and 25b are positioned within the closed magnetic loop so as to respectively receive bias magnetic fields in opposite directions to each other and perpendicular to the lamination plane when no acceleration is applied. Sine the bias magnetic fields applied to the spin valve GMR element 25a and the spin valve GMR element 25b are in the directions opposite to each other, the magnetization directions of the respective pinned layers in these spin valve GMR elements 25a and 25b are fixed to the same direction even when they are connected in series with each other to form the bridge configuration. Thus, the pair of spin valve GMR elements can be formed in a single chip resulting the acceleration sensor to more downsize.

According to this embodiment, further, because it is not necessary to form electrodes on the spring members and the magnetic field generation members with weight, the wiring structure can be simplified. Also, because of a low impedance, the acceleration sensor of this embodiment is relatively unaffected by external disturbance when compared with the piezo-electric type acceleration sensor and the electrostatic capacitance type acceleration sensor.

In the aforementioned embodiment, the closed magnetic loop is formed by two permanent magnets with opposite magnetic polarities to each other on their surfaces that face the magnetic filed detection sensor. However, the present invention is not limited to such configuration. For example, a single permanent magnet may be provided for each magnetic field generation member with weight.

Furthermore, although the IC chip is mounted in the housing of the acceleration sensor in the aforementioned embodiment, such IC chip may be separately mounted from the acceleration sensor in modifications.

As for the magnetic field detection element, a TMR element may be used instead of the spin valve GMR element.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A spring member for an acceleration sensor, comprising:
a first movable section having a plane plate shape, for fixing a first magnetic field generation member with weight used for detecting acceleration in a direction of a Z-axis that is perpendicular to an X-Y plane;
a single first support arm section having a strip shape parallel to a plane of said first movable section when no acceleration is applied, one end of said single support arm section being integrally connected to one end of said first movable section and the other end of said single first support arm section being fixed;
at least two second support arm sections each having a strip shape parallel to said X-Y plane when no acceleration is applied, said at least two second support arm sections freely moving in an X-axis direction and a Y-axis direction and capable of twisting; and
a second movable section having a plane plate shape parallel to said at least two second support arm sections when no acceleration is applied, for fixing a second magnetic field generation member with weight used for detecting accelerations in directions of the X-axis and the Y-axis, said second movable section being supported by said at least two second support arm sections,
said first movable section being supported only by said single first support arm section in a cantilever configuration,
said first movable section, said first support arm section, said second movable section and said at least two second support arm sections being integrally formed.

2. The spring member as claimed in claim 1, wherein said at least two second support arm sections include four support arms running along the X-axis direction and the Y-axis direction perpendicular to each other, and wherein one ends of said four support arms are connected to an outer frame section fixed to a housing member and the other ends of said four support arms are connected to said second movable section.

3. An acceleration sensor including a first spring member for detecting acceleration in a direction of a Z-axis that is perpendicular to an X-Y plane, a housing member, a first magnetic field generation member with weight, and a first magnetic field detection sensor attached to said housing member to face said first magnetic field generation member with weight,
said first spring member comprising:
a first movable section having a plane plate shape, fixes to said first magnetic field generation member with weight; and
a single first support arm section having a strip shape parallel to a plane of said first movable section when no acceleration is applied, one end of said single first support arm section being integrally connected to one end of said first movable section and the other end of said single first support arm section being connected to an outer frame section fixed to section fixed to said housing member,
said first movable section being supported only by said single first support arm section in a cantilever configures,
said first magnetic detection sensor having at least one multi-layered magnetoresistive effect element having a lamination plane parallel to said X-Y plane and including a magnetization fixed layer and a magnetization free layer,
said at least one multi-layered magnetoresistive effect element being arranged to receive from said first magnetic field generation member with weight magnetic field substantially perpendicular to said lamination plane of said at least one multi-layered magnetoresistive effect element when no acceleration is applied,
said acceleration sensor further including a second spring member for detecting accelerations in directions of an X-axis and a Y-axis, having a plane plate shape parallel to said X-Y plane when no acceleration is applied, said second spring member freely moving in an X-axis direction and a Y-axis direction, a second magnetic field generation member with weight fixed to said second spring member, and second and third magnetic field detection sensors attached to said housing member to face said second magnetic field generation member with weight,
each of said second and third magnetic field detection sensors having at least one multi-layered magnetoresistive effect element having a lamination plane parallel to the X-axis direction and the Y-axis direction respectively, and including a magnetization fixed layer and a magnetization free layer,
at least one multi-layered magnetoresistive effect element of each of said second and third magnetic field detection sensors being arranged to receive from said second magnetic field generation member with weight magnetic field substantially perpendicular to said lamination plane of said at least one multi-layered magnetoresistive effect element of each of said second and third magnetic field detection sensors when no acceleration is applied.

4. The acceleration sensor as claimed in claim 3, wherein said second spring member has at least two second support arm sections capable of twisting, and a second movable section fixed to said second magnetic field generation member with weight and supported by said at least two second support arm sections.

5. The acceleration as claimed in claim 4, wherein said at least two second support arm sections of said second spring member include four support arms running along the X-axis direction and the Y-axis direction perpendicular to each other, and wherein one ends of said four support arms are connected to an outer frame section fixed to said housing member and the other ends of said four support arms are connected to said second movable section.

6. The acceleration sensor as claimed in claim 3, wherein said first spring member and said second spring member are integrally formed to have a single plane plate shape.

7. The acceleration sensor as claimed in claim 3, wherein said second magnetic field generation member with weight is fixed to one surface of said second spring member so as to convert acceleration applied thereto into a rotation moment.

8. The acceleration sensor as claimed in claim 3, wherein said at least one multi-layered magnetoresistive effect element of said second magnetic field detection sensor or said third magnetic field detection sensor comprises at least one linear section running along a direction perpendicular to a magnetization direction of said magnetization fixed layer in said lamination plate.

9. The acceleration sensor as claimed in claim 3, wherein said at least one multi-layered magnetoresistive effect element of said second magnetic field detection sensor or said third magnetic field detection sensor is a giant magnetoresistive effect element or a tunnel magnetoresistive effect element.

10. An acceleration sensor including a first spring member for detecting acceleration in a direction of a Z-axis that is perpendicular to an X-Y plane, a housing member, a first magnetic field generation member with weight, and a first magnetic field detection sensor attached to said housing member to face said first magnetic field generation member with weight, said first spring member comprising:

a first movable section having a plane plate shape, fixes to said first magnetic field generation member with weight; and a single first support arm section having a strip shape parallel to a plane of said first movable section when no acceleration is applied, one end of said single first support arm section being integrally connected to one end of said first movable section and the other end of said single first support arm section being connected to an outer frame section fixed to section fixed to said housing member, said first movable section being supported only by said single first support arm section in a cantilever configures, said first magnetic detection sensor having at least one multi-layered magnetoresistive effect element having a lamination plane parallel to said X-Y plane and including a magnetization fixed layer and a magnetization free layer, said at least one multi-layered magnetoresistive effect element being arranged to receive from said first magnetic field generation member with weight magnetic field substantially perpendicular to said lamination plane of said at least one multi-layered magnetoresistive effect element when no acceleration is applied, said at least one multi-layered magnetoresistive effect element of said first magnetic field detection sensor comprising at least one linear section running along a direction perpendicular to a magnetization direction of said magnetization fixed layer in said lamination plane.

11. A magnetic disk drive apparatus provided with an acceleration sensor including a first spring member for detecting acceleration in a direction of a Z-axis that is perpendicular to an X-Y plane, a housing member, a first magnetic field generation member with weight, and a first magnetic field detection sensor attached to said housing member to face said first magnetic field generation member with weight;

said first spring member comprising:

a first movable section having a plane plate shape, fixed to said first magnetic field generation member with weight; and a single first support arm section having a strip shape parallel to a plane of said first movable section when no acceleration is applied, one end of said single first support arm section being integrally connected to one end of said first movable section and the other end of said single first support arm section being connected to an outer frame section fixed to said housing member, said first movable section being supported only by said single first support arm section in a cantilever configuration, said first magnetic field detection sensor having at least one multi-layered magnetoresistive effect element having a lamination plane parallel to said X-Y plane and including a magnetization fixed layer and a magnetization free layer, said at least one multi-layered magnetoresistive effect element being arranged to receive from said first magnetic field generation member with weight magnetic field substantially perpendicular to said lamination plane of said at least one multi-layered magnetoresistive effect element when no acceleration is applied, said acceleration sensor further including a second spring member for detecting accelerations in directions of an X-axis and a Y-axis, having a plane plate shape parallel to said X-Y plane when no acceleration is applied, said second spring member freely moving in an X-axis and a Y-axis direction, a second magnetic field generation member with weight fixed to said second spring member, and second and third magnetic field detection sensors attached to said housing member to face said second magnetic field generation member with weight, each of said second and third magnetic field detection sensors having at least one multi-layered magnetoresistive effect element having a lamination plane parallel to the X-axis direction and the Y-axis direction respectively, and including a magnetization fixed layer and a magnetization free layer, said at least one multi-layered magnetoresistive effect element of each of said second and third magnetic field detection sensors being arranged to receive from said second magnetic field generation member with weight magnetic field substantially perpendicular to said lamination plane of said at least one multi-layered magnetoresistive effect element of each of said second and third magnetic field detection sensors when no acceleration is applied.

12. The magnetic disk drive apparatus as claimed in claim 11, wherein said second spring member has at least two second support arm sections capable of twisting, and a second movable section fixed to said second magnetic field generation member with weight and supported by said at least two second support arm sections.

13. The magnetic disk drive apparatus as claimed in claim 12, wherein said at least two second support arm sections of said second spring member include four support arms running along the X-axis direction and the Y-axis direction perpendicular to each other, and wherein one ends of said four support arms are connected to an outer frame section fixed to said housing member and the other ends of said four support arms are connected to said second movable section.

14. The magnetic disk drive apparatus as claimed in claim 11, wherein said first spring member and said second spring member are integrally formed to have a single plane plate shape.

\* \* \* \* \*